M. HAEBERLEIN.
AUTOMATIC SHUTDOWN DEVICE FOR PRESSURE GOVERNORS.
APPLICATION FILED AUG. 23, 1919.

INVENTOR
Max Haeberlein
BY C. P. Goepel.
ATTORNEY

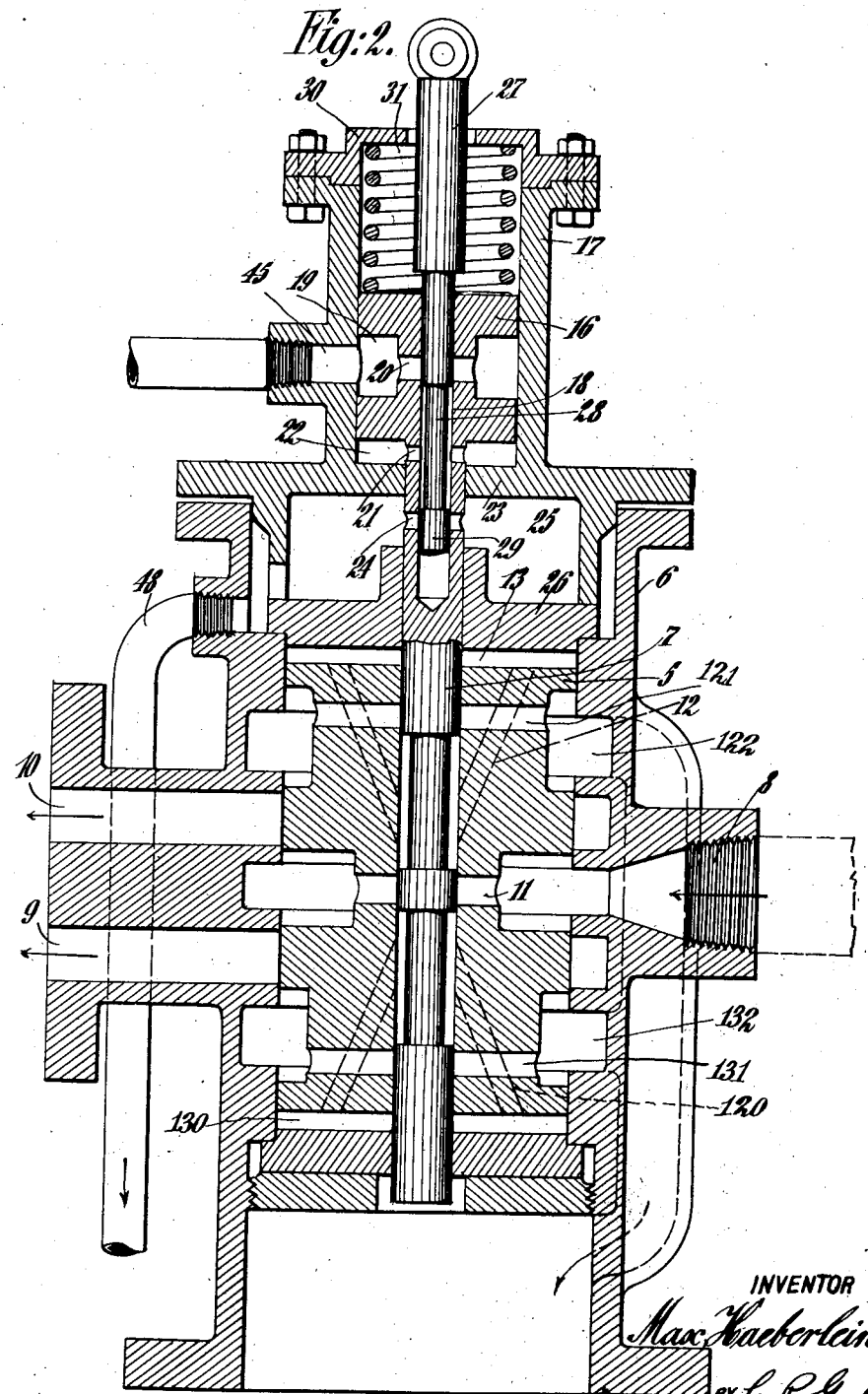

M. HAEBERLEIN.
AUTOMATIC SHUTDOWN DEVICE FOR PRESSURE GOVERNORS.
APPLICATION FILED AUG. 23, 1919.
1,411,348.
Patented Apr. 4, 1922.
4 SHEETS—SHEET 3.
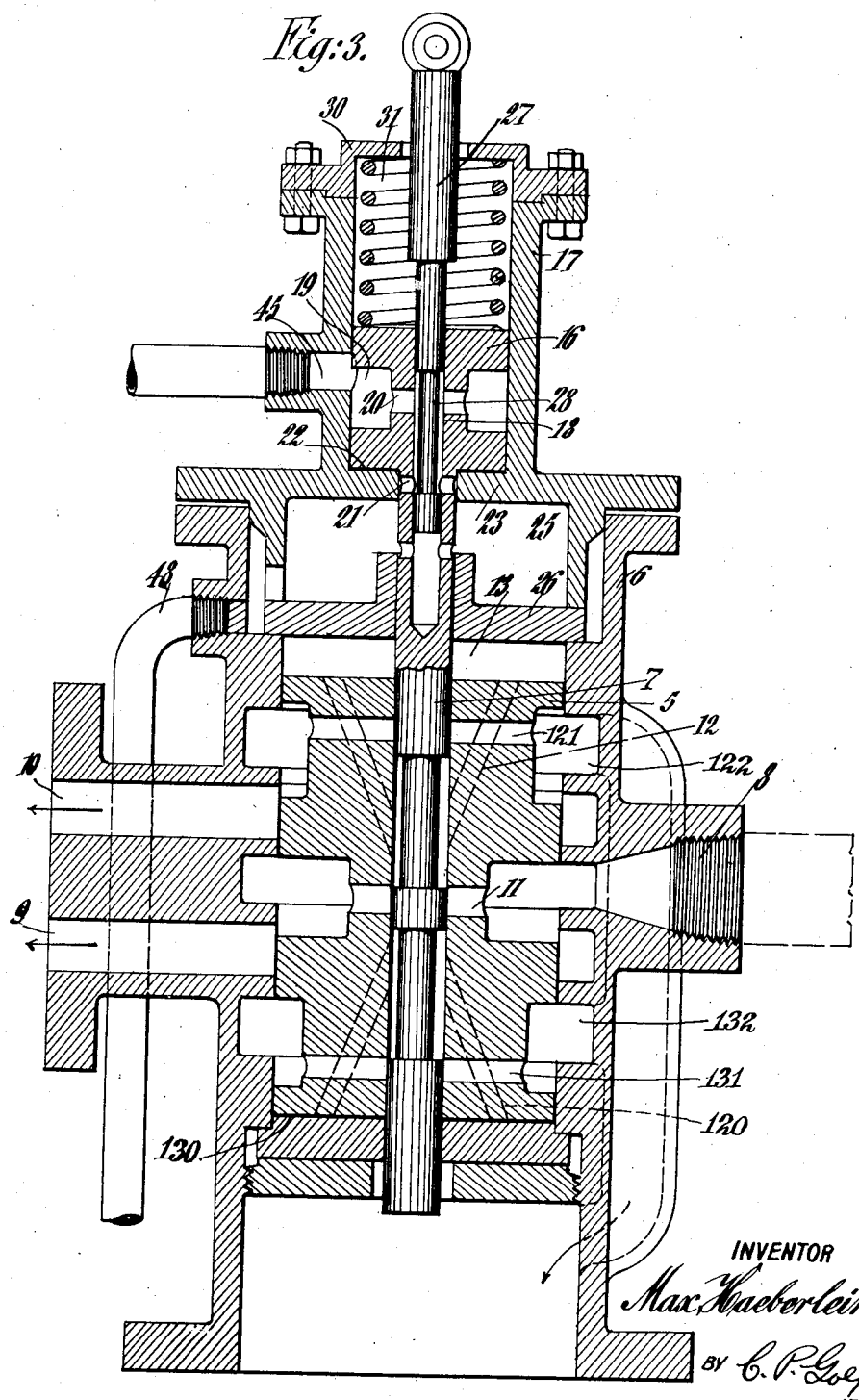
Fig:3.
INVENTOR
Max Haeberlein
BY C. P. Goepel
ATTORNEY

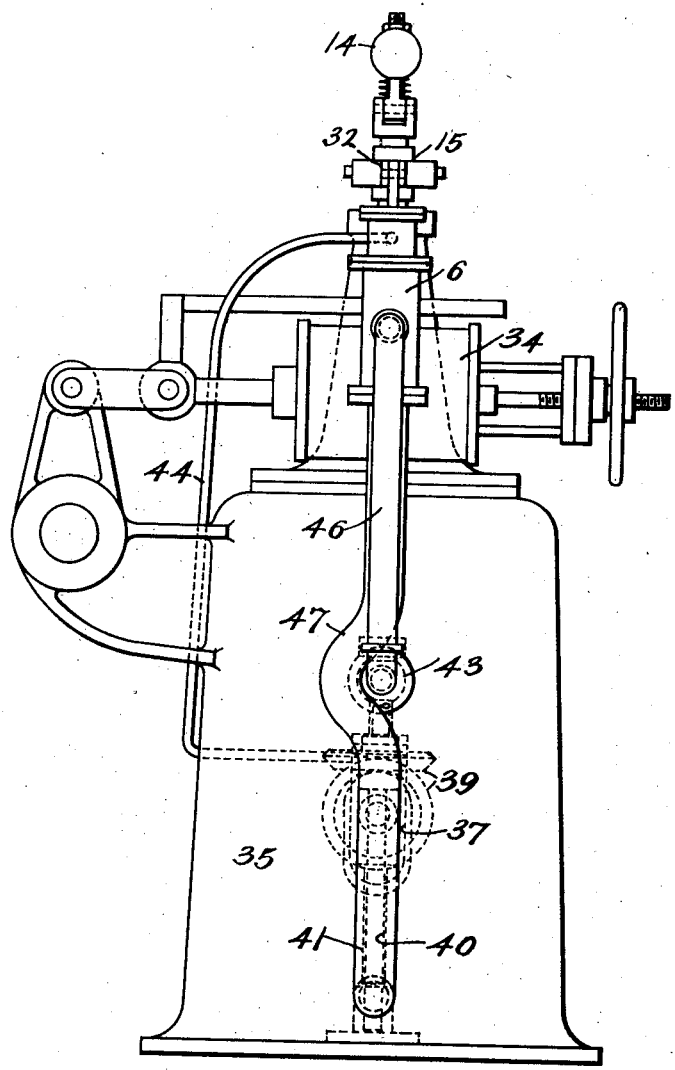

UNITED STATES PATENT OFFICE.

MAX HAEBERLEIN, OF MOUNTAIN LAKES, NEW JERSEY.

AUTOMATIC SHUTDOWN DEVICE FOR PRESSURE GOVERNORS.

1,411,348.  Specification of Letters Patent.  Patented Apr. 4, 1922.

Application filed August 23, 1919. Serial No. 319,496.

*To all whom it may concern:*

Be it known that I, MAX HAEBERLEIN, a citizen of the United States of America, and a resident of Mountain Lakes, New Jersey, county of Morris, having invented certain new and useful Improvements in Automatic Shutdown Devices for Pressure Governors, do hereby declare that the following is a full, clear, and exact description of the same.

This invention relates to automatic shut down devices for pressure governors, such as are usually employed in connection with turbines and other prime movers to control the supply of motive fluid.

Generically considered, the present improvement comprehends the provision of means for automatically shutting down or stopping the operation of the pressure governor, with the gate mechanism of the prime mover which controls the supply of motive fluid completely closed, should the driving belt for the speed regulating centrifugal governor break.

More particularly my invention provides a fluid actuated regulating valve for controlling the supply of pressure fluid to the operating cylinder of the pressure governor and incuding a fluid controlled pilot valve which in turn controls the actuating of said regulating valve, and an auxiliary pilot valve operatively connected to the centrifugal speed governor and cooperatively associated with the main pilot valve to govern the normal operation of the regulating valve but which will permit the operation of the main pilot valve, upon a failure of the pressure fluid supply for the pressure chamber, whereupon the regulating valve is actuated to shut down the operation of the pressure governor after the gate mechanism of the prime mover has been thereby actuated and moved to a completely closed position.

It is also an object of my invention to provide an improved automatic controlling or shut-down device for pressure governors in which relatively few parts of simple construction are employed and which will necessitate no radical modifications in the usual type of regulating or controlling valve employed for this purpose.

With the above and other objects in view my invention consists in an improved automatic shut-down device for pressure governors as above characterized, and in the form, construction and relative arrangement of its several parts as will be hereinafter more fully described, illustrated in the accompanying drawings and subsequently incorporated in the subjoined claims.

In the drawings wherein I have disclosed one practical embodiment of my invention, and in which similar reference characters designate corresponding parts throughout the several views;

Fig. 2 is an enlarged sectional view showing the regulating valve in an intermediate position;

Fig. 3 is a similar view showing the regulating valve when moved to a position to shut down or stop the operation of the pressure governor upon a failure of the pressure fluid supply; and Fig. 4 is a side elevation of Fig. 1.

Figure 1:
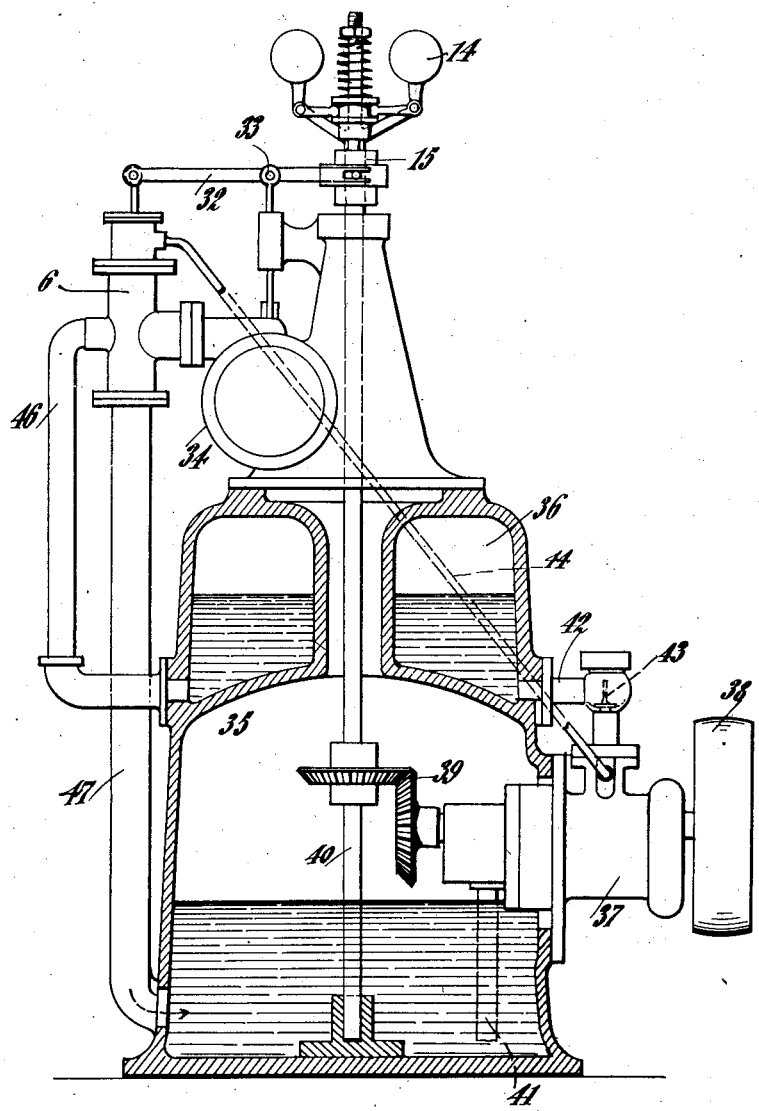
Fig. 1 is an elevation showing the fluid pressure supply system for the governor controlling the supply of motive fluid for the prime mover, the regulating valve, for said governor, and the centrifugal speed governor operatively connected to the regulating valve, the fluid reservoir and pressure chamber being shown in section.

In the operation of the ordinary hydraulic turbine or other prime mover, it is usual to provide a pressure governor which is operatively connected to the gate mechanism of the turbine which controls the admission of the motive fluid through a series of injector nozzles. In conjunction with such a pressure governor, a regulating valve is employed which automatically controls the admission of a pressure fluid to opposite sides of a piston reciprocating in the operating cylinder of the governor, upon an increase or decrease in the speed of the prime mover with respect to a predetermined normal operating speed whereby the admission of the motive fluid, which exerts its influence against the rotor of the prime mover, will be increased or decreased to a corresponding extent.

In Figs. 2 and 3 of the drawings, I have illustrated such a regulating valve which includes the floating piston 5 arranged in the valve casing 6 and a pilot valve 7 operating in an axial bore formed through said piston. 8 designates the admission port for the oil or other fluid which is supplied under pressure in the manner to be presently related, and 9 and 10 indicate spaced outlet ports at the opposite side of the piston casing through which the pressure is delivered and conducted to the operation cylinder of the pressure governor. The operation of this floating piston and pilot valve to automatically control the supply of pressure fluid to the governor cylinder in the normal operation of the prime mover is the same as in the ordinary regulating valve of this type well known in the art and therefore requires no extended description. It will suffice to state that in the axial movement of the pilot valve relative to the floating piston in one direction or the other, the pressure fluid is admitted to the bore of the piston through radial ports 11, and passes from said bore through the ducts 12 or 120 extending obliquely through the piston to either end thereof as the case may be where the pressure fluid enters one of two chambers 13, 130 between the end of the piston and the head of the piston chamber. The piston is also provided with radial ports 121, 131, which lead into hollow ports 122, 132, which in turn lead into an outlet pipe hereinafter referred to, as shown in dotted lines in Figs. 2 and 3. The floating piston will therefore be shifted in the opposite direction and one or the other of the outlet ports 9 or 10 opened so that the pressure fluid may pass through said port and to the operating cylinder of the governor.

In Fig. 1 of the drawings I have shown a conventional type of centrifugal governor indicated generally by the numeral 14. In the usual construction, the sliding sleeve and collar 15 of this governor is operatively connected to the upper end of the pilot valve 7. The governor is generally driven by a belt from the prime mover and when the speed of the prime mover increases, the sleeve 15 will move upwardly on the governor shaft and will move downwardly thereon when the operating speed decreases. If the speed of the prime mover is normal, said sliding sleeve occupies an intermediate position. As the pilot valve of the regulator is mechanically connected to this governor actuated sleeve and collar it is evident that this valve, and in turn the floating piston, are controlled by the centrifugal action of the governor balls. Thus it will be clear that, if, for instance, the load on the prime mover decreases, the speed of the prime mover will tend to rise and as the governor is driven from the prime mover, the speed of the governor likewise increases. In such increase of the governor speed the collar 15 rises on the governor shaft and causes an actuation of the pilot valve in such a manner that the floating piston is moved to admit pressure fluid to the operating cylinder of the governor for the motive fluid supply for the prime mover, so as to shut down or decrease the motive power until the operating speed of the prime mover is again restored to normal. On the other hand, if the speed of the prime mover decreases, it will be apparent that the speed of the centrifugal governor will likewise decrease and therefore the sleeve and collar 15 will move downwardly and the pilot valve will again be actuated so that floating piston is shifted in an opposite direction to admit the pressure fluid to the operating cylinder of the governor so that it will act on the piston therein and open the gate mechanism of the prime mover to thereby increase the supply of the motive fluid. Now it is quite evident that if the driving belt for the centrifugal governor should break, the latter will cease to operate and the sleeve and collar 15 will be moved downwardly on the governor shaft to its lowest position. Therefore the floating piston of the regulator valve will be shifted and pressure fluid admitted to the operating cylinder of the governor so that the gate mechanism of the prime mover will be fully opened. This results in the run away or racing of the engine, and might possibly result in serious damage.

It is the purpose and aim of the present improvements to obviate the possibility of such a disastrous occurrence in the operation of the usual pressure governor or controller for prime movers, and to this end I provide the pilot valve 7 with a piston 16 upon its upper end, said piston working in a secondary cylinder or casing 17 upon the upper head of the regulator valve casing 6, the lower end of the piston having a loose leakage fit in the casing 17. This pilot valve piston is provided with an axial bore 18 which extends downwardly into the stem of the pilot valve. The piston 16 is further provided with an annular pressure receiving chamber 19 and ports 20 affording communication between this annular chamber and the bore in said piston. Immediately below the piston 16 the ports or openings 21 are provided in the pilot valve and afford communication between the bore 18 and the space indicated at 22 between the lower side of the piston 16 and the head wall 23 of the valve casing 6. Additional ports 24 also connect the bore 18 with a chamber 25 between the wall 23 and the head wall 26 for the upper end of the casing chamber in which the valve piston 5 operates.

An auxiliary pilot valve 27 is engaged in the bore 18 for reciprocatory movement relative to the primary pilot valve and its piston 16. The stem of the auxiliary pilot valve 27 is formed with a diametrically reduced portion 28 and under normal operating conditions, the ports 20 are closed by the upper section of the pilot valve stem while the lower end 29 thereof closes the ports 24.

The upper end of the cylinder 17 is closed by a cap 30 having a central opening through which the pilot valve 27 extends and a coil spring 31 is arranged within said cylinder between the cap plate 30 and the piston 16 and normally tends to urge said piston downwardly within the cylinder. The upper end of the pilot valve 27 is operatively connected through the medium of a lever 32 to the sliding sleeve 15 of the centrifugal governor, said lever being fulcrumed intermediate of its ends as at 33 upon a suitable fixed support.

Upon a suitable governor base the operating cylinder 34 of the fluid pressure governor is mounted and this governor base is provided in its lower portion with an oil or other fluid containing reservoir 35 and above said reservoir with the pressure chamber 36 which contains air under pressure acting upon the body of fluid which is supplied to said chamber through the medium of a pump 37 during the operation of the prime mover. This pump is driven by a suitable belt from the prime mover which is engaged upon the pulley 38 fixed on one end of the pump shaft. The other end of the pump shaft is geared as at 39 to the vertically disposed shaft or spindle 40 of the centrifugal governor 14. 41 designates the suction pipe of the pump extending downwardly into the fluid within the reservoir 35. The supply connection 42 between the pump chamber and the pressure chamber 36 is equipped with a check valve 43 to prevent the return flow of the fluid from the pressure chamber into the pump. A pipe 44 is connected at one of its ends to the pump 37 below the check valve 43 and at its other end is connected to the inlet port 45 of the cylinder 17, which port is in constant communication with the annular chamber 19 in the pilot valve piston 16. 46 designates the pressure fluid supply pipe which is connected to the inlet port 8 of the regulator valve and supplies fluid under pressure from the chamber 36 for the operation of the pressure governor. The oil or other pressure fluid for the operation of the valve 5 is discharged from the casing 6 and returned to the reservoir 35 through the pipe 47 while a drain pipe 48 also returns oil collecting within the chamber 25 to said reservoir.

In the operation of the device as above described the pressure fluid is supplied directly from the pump to the chamber 19 and passes through the bore 18 into the space 22 beneath the piston 16 when the parts are in the position shown in Fig. 2, and leaks around the walls of the lower part of the piston 16 when the parts are in the position shown in Fig. 3. The pressure fluid in this space counteracts the action of the spring 31 tending to force the piston downwardly and maintains said piston in an intermediate position under normal operating conditions. When the speed of the governor or prime mover decreases, the sleeve 15 of the centrifugal governor moves downwardly and the auxiliary pilot valve 27 is pulled upwardly, thereby permitting additional pressure fluid to enter the space 22 and force the piston 16 upwardly. The pilot valve 7 is thus moved relative to the regulator valve piston 5 so that the pressure fluid may enter the chamber 130 through the ports 120 beneath the piston and shift said piston upwardly so that the pressure fluid may pass through the port 10 whence it is conducted to the cylinder 34 of the pressure regulator to actuate a piston therein in the proper direction and open the gate mechanism of the prime mover (not illustrated) to increase the supply of motive fluid. As the piston moves upwardly the port 121 is brought into communication with the port 122 and the pressure fluid in the upper chamber 13 escapes through the upper ducts 12 to the central bore of the piston which, by reason of the pilot valve 7 moving up, opens to the port 121 and the pressure liquid escapes through the outlet port 122 to the escape pipe 47. When the speed of the engine increases the sleeve 15 moves upwardly and the auxiliary pilot valve 27 is forced downwardly thereby opening ports 24 whereupon the spring 31 moves the piston 16 and the pilot valve downwardly, so that the pressure fluid may pass upwardly into the upper chamber 25 and thereby move the regulator valve 5 downwardly. The pressure fluid now passes through the outlet port 9 to the cylinder of the pressure governor and the gate mechanism of the prime mover is operated to cut down the supply of motive fluid. It will be understood as the piston moves downwardly the fluid in the lower chamber 131 escapes through the ducts 120, central bore, and ports 131, 132 to the pipe 47.

Now it is apparent from the foregoing description that in case the operating belt for the centrifugal governor should break, the continued supply of fluid under pressure from the reservoir 35 will cease and owing to the back pressure of fluid from the chamber 36, the check valve 43 will close thereby destroying the pressure in the pipe 44. Thus there will be a failure of the fluid pressure in the chamber 19 and consequently in the space 22, so that the spring 31 will immediately act to force the piston 16 and the primary pilot valve downwardly, notwithstanding the fact that the auxiliary pilot valve 27 is moving upwardly owing to the fact that the sleeve of the centrifugal governor has dropped to its lowest position. Upon the failure of pressure in space 22, the piston 16 by the action of the spring 31 causes the fluid to leak through the clearance space necessary in order to permit of the easy operation of the pilot valve 7 and its piston 16, into the chamber 25 or into the annular space 19, thereby releasing the pressure beneath said piston. It will be understood that there is sufficient fluid under pressure in the chamber 36 to effect the proper actuation of the regulator valve 5 when the pilot valve is thus forced downwardly by the spring 31, and this pressure fluid passes through the outlet port 9 and is conducted to the cylinder 34 of the pressure regulator where it actuates the piston and moves the gate mechanism controlling the supply of motive fluid to the prime mover, to its closed position. Thus the engine or other prime mover is rendered inoperative and all possibility of serious damage resulting from a run away of the engine is precluded.

From the foregoing description considered in connection with the accompanying drawings, it will be appreciated that by means of a very simple addition to the ordinary pressure governor regulating valve, I have succeeded in overcoming a very serious deficiency of such valves as they are now constructed and operated. The present invention, in practical use has fully demonstrated its utility and subserves the desired purpose in a very satisfactory manner. It is to be understood that the arrangement of the centrifugal governor, the reservoir and pressure chamber and the pump, are merely illustrative and that these several features may be operatively mounted and arranged in many other desired ways. It is also apparent that if preferred, instead of gearing the pump to the centrifugal governor, a separate direct drive may be provided for the latter either from the prime mover or from a separate source of power.

It is therefore to be understood that while I have herein shown and described one practical embodiment of my invention, which has given excellent service, the device may nevertheless be exemplified in numerous other alternative constructions. Accordingly I reserve the privilege of adopting all such legitimate changes as may be fairly embodied within the spirit and scope of the invention as claimed.

I claim:

1. In combination with a pressure governor, a fluid actuated regulating valve therefor, fluid pressure controlled means determining the operation of said valve, a centrifugal governor mechanism, and additional means cooperating with said pressure controlled means and operatively connected to the centrifugal governor mechanism and acting to secure the operation of said pressure controlled means to effect a closing movement of the pressure governor upon failure of the fluid pressure.

2. In combination with a pressure governor, a fluid actuated regulating valve therefor, fluid pressure controlled means determining the operation of said valve and including a spring tending to actuate said means against the counteracting influence of the fluid pressure, a centrifugal governor mechanism, and additional means cooperating with said pressure controlled means and operatively connected to the centrifugal governor mechanism and acting to secure the actuation of the pressure controlled means by said spring to effect a closing movement of the pressure governor.

3. In combination with a pressure governor, a fluid actuated regulating valve therefor, fluid pressure controlled means determining the operation of said valve, a centrifugal governor mechanism, an auxiliary valve operatively connected to the centrifugal governor mechanism and acting to secure the operation of said pressure controlled means upon a failure of the fluid pressure to effect a closing movement of the pressure governor.

4. In combination with a pressure governor, a fluid actuated regulating valve therefor, including a fluid pressure controlled main pilot valve, a centrifugal governor mechanism, and an auxiliary pilot valve mechanism, and an auxiliary pilot valve operatively connected to the centrifugal governor mechanism to govern the normal operation of the regulating valve, and permit of the operation of said main pilot valve upon a failure of the fluid pressure to effect a closing movement of the pressure governor.

5. In combination with a pressure governor, a fluid actuated regulating valve therefor including a fluid pressure controlled main pilot valve, and a spring tending to actuate said valve against the counteracting influence of the fluid pressure, a centrifugal governor mechanism, and an auxiliary pilot valve operatively connected to the centrifugal governor mechanism and movable independently of said main pilot valve upon a failure of the fluid pressure, to thereby permit of the actuation of the main pilot valve by said spring and effect an operation of the regulating valve to effect a closing movement of the pressure governor.

6. In combination with a pressure governor, a fluid actuated regulating valve therefor including a fluid pressure controlled main pilot valve and a spring tending to actuate said pilot valve against a counteracting influence of the fluid pressure, a centrifugal governor mechanism, and an auxiliary pilot valve telescopically associated with the main pilot valve and operatively connected to the centrifugal governor mechanism and movable independently of said main pilot valve upon a failure of the fluid pressure, to thereby permit of the actuation of the main pilot valve by said spring, and effect an operation of the regulating valve, to effect a closing movement of the pressure governor.

7. In combination with a pressure governor, a fluid actuated regulating valve therefor including a main pilot valve having a piston on one end, a cylinder in which said piston operates, and means for subjecting said piston to the action of a pressure fluid to thereby determine the operation of the regulating valve under normal conditions, a spring within said cylinder tending to move the piston and pilot valve in one direction against the counteracting influence, a centrifugal governor mechanism and additional means connected to the centrifugal governor mechanism and movable independently of the main pilot valve piston upon a failure of the fluid pressure at the supply source, to thereby permit of the actuation of said main pilot valve by said spring, and effect an operation of the regulating valve to effect a closing movement of the pressure governor.

8. In combination with a pressure governor, a fluid actuated regulating valve therefor, including a main pilot valve having a piston on one end, a cylinder in which said piston operates, said piston of the valve having an axial bore and ports opening into said bore at one side of the piston, said valve also having additional ports for the escape of the pressure fluid through said bore, means for supplying pressure fluid to said cylinder to act upon the piston and control the operation of the regulating valve under normal conditions, a spring arranged in said cylinder and tending to move the piston and pilot valve in one direction against the counteracting influence of the pressure fluid, a centrifugal governor mechanism, and an auxiliary pilot valve engaged in said bore and operatively connected to the centrifugal governor mechanism and movable independently of the main pilot valve upon a failure of the fluid pressure at the source, and thereby permit of the actuation of the piston and the main pilot valve by said spring to effect an operation of the regulating valve and thereby effect a closing movement of the pressure governor.

In testimony that I claim the foregoing as my invention, I have signed my name.

MAX HAEBERLEIN.